United States Patent [19]

Roark

[11] 4,041,785
[45] Aug. 16, 1977

[54] MECHANICAL DRIVE SYSTEM FOR A REMOTE AREA

[76] Inventor: Thomas J. Roark, SR 2 Box 77, Nettie, W. Va. 26681

[21] Appl. No.: 703,202

[22] Filed: July 7, 1976

[51] Int. Cl.² .................. F16H 37/00; F16H 7/00; B65G 23/00
[52] U.S. Cl. .................................. 74/11; 74/221; 198/813
[58] Field of Search .................... 74/11, 15, 221; 198/203

[56] References Cited

U.S. PATENT DOCUMENTS

| 1,903,488 | 4/1933 | Stibbs | 74/221 |
| 2,775,131 | 12/1956 | Smits | 74/221 |
| 3,963,114 | 6/1976 | Younger | 198/203 |
| 3,985,225 | 10/1976 | Baum et al. | 74/221 X |

Primary Examiner—Leonard H. Gerin
Attorney, Agent, or Firm—Shanley, O'Neil and Baker

[57] ABSTRACT

A system for obtaining mechanical power from a driven belt conveyor which services a remote area such as a coal mine where delivering electrical power is difficult and/or hazardous. The system includes apparatus selectively driven by the return flight of the mined material conveyor belt to provide mechanical driving power to an auxiliary device, such as a pump. A pair of driveable rollers are coupled together on the same side of the belt and a tensioning roller, for urging the conveyor belt into driving engagement with the driveable rollers, is adjustably positioned on the opposite side of the belt.

10 Claims, 4 Drawing Figures

MECHANICAL DRIVE SYSTEM FOR A REMOTE AREA

This invention relates to a system for obtaining mechanical power in a remote area, such as a coal mine, which is served by a driven belt material-handling conveyor. More specifically, the invention relates to an apparatus for obtaining mechanical power from a conveyor belt where electrical power is either not available or hazardous and difficult to provide.

Delivering electrical power in a mine presents substantial hazards, including fire and explosion. Approved equipment for providing electrical power is expensive, requires careful installation, and must be carefully maintained and regularly inspected. However, there is often a need for driving power in such remote areas at short notice. Such needs can be met readily by the invention using existing conveyor equipment.

In accordance with the invention, power to operate auxiliary equipment, such as pumps, is derived directly from the return flight of a conveyor belt used to transport material from the mine. This is accomplished by using apparatus arranged to be selectively driven by the return flight of the belt.

Other contributions and advantages of the invention will be more evident from a description of a specific embodiment as shown in the accompanying drawings. In these drawings.

Figure 1:
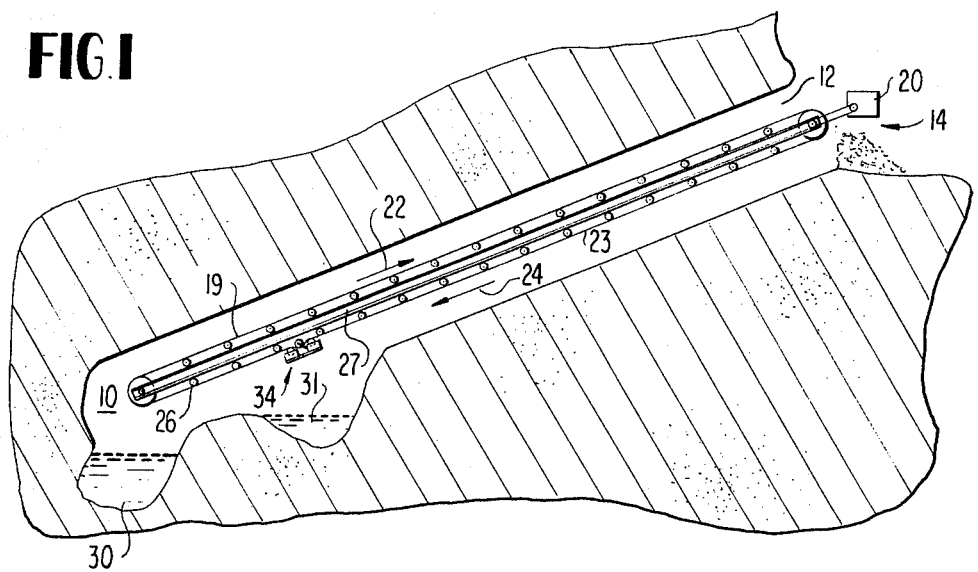
FIG. 1 is a schematic showing of the system of this invention in use in a mine.

FIG. 1 illustrates diagramically a typical mining operation in which coal or other solid material is removed from a remote area 10 through shaft 12 by a belt conveyor structure 14. A belt 18 is driven by a motor 20 located outside the mine shaft. The belt 18 of conveyor 14 has an upper or conveying flight 20 which travels in the direction of arrow 22, and a lower or return flight 23 which travels in the direction of arrow 24. A plurality of closely-spaced rollers 26, secured to conveyor framework 27, support the weight of the material being conveyed from the mine.

Water will frequently accumulate in an area being worked, such as depression 30, so as to impede men or equipment. In order to proceed the water must be removed to another area 31, or removed entirely from the mine. To deliver electrical power to such working area, as previously explained, is difficult and involves time delays.

To remove standing water 30 in accordance with this invention, a power take-off unit 34 is associated with the conveyor so that a pump or other auxiliary equipment can be driven directly by the conveyor belt return path 23.

Figure 2:
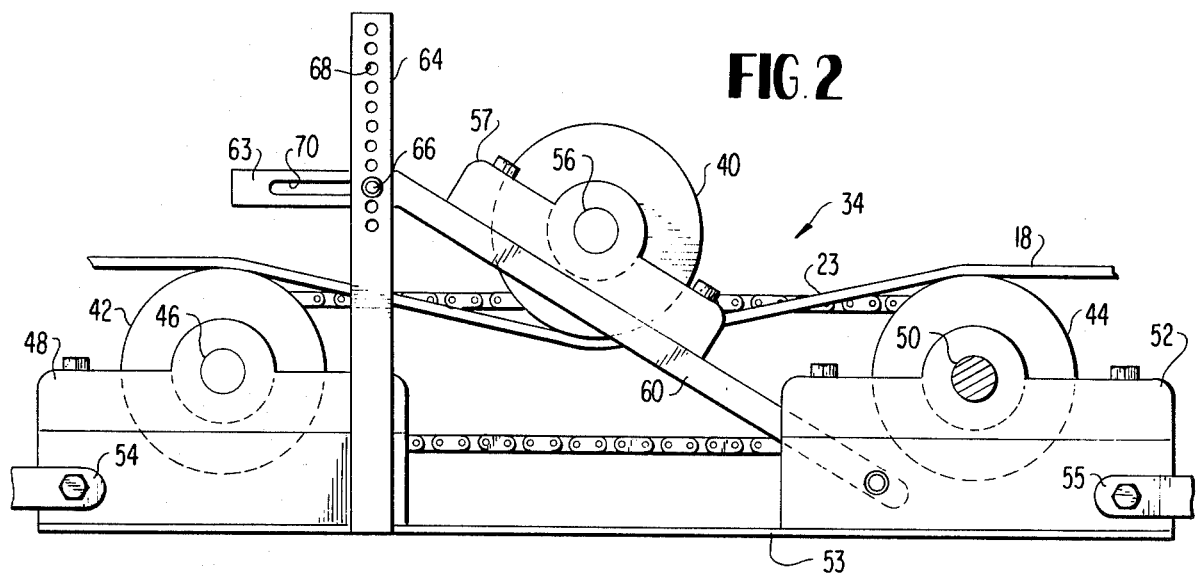
FIG. 2 is a side elevation of apparatus embodying the invention in operating, power-output, position.
Figure 3:
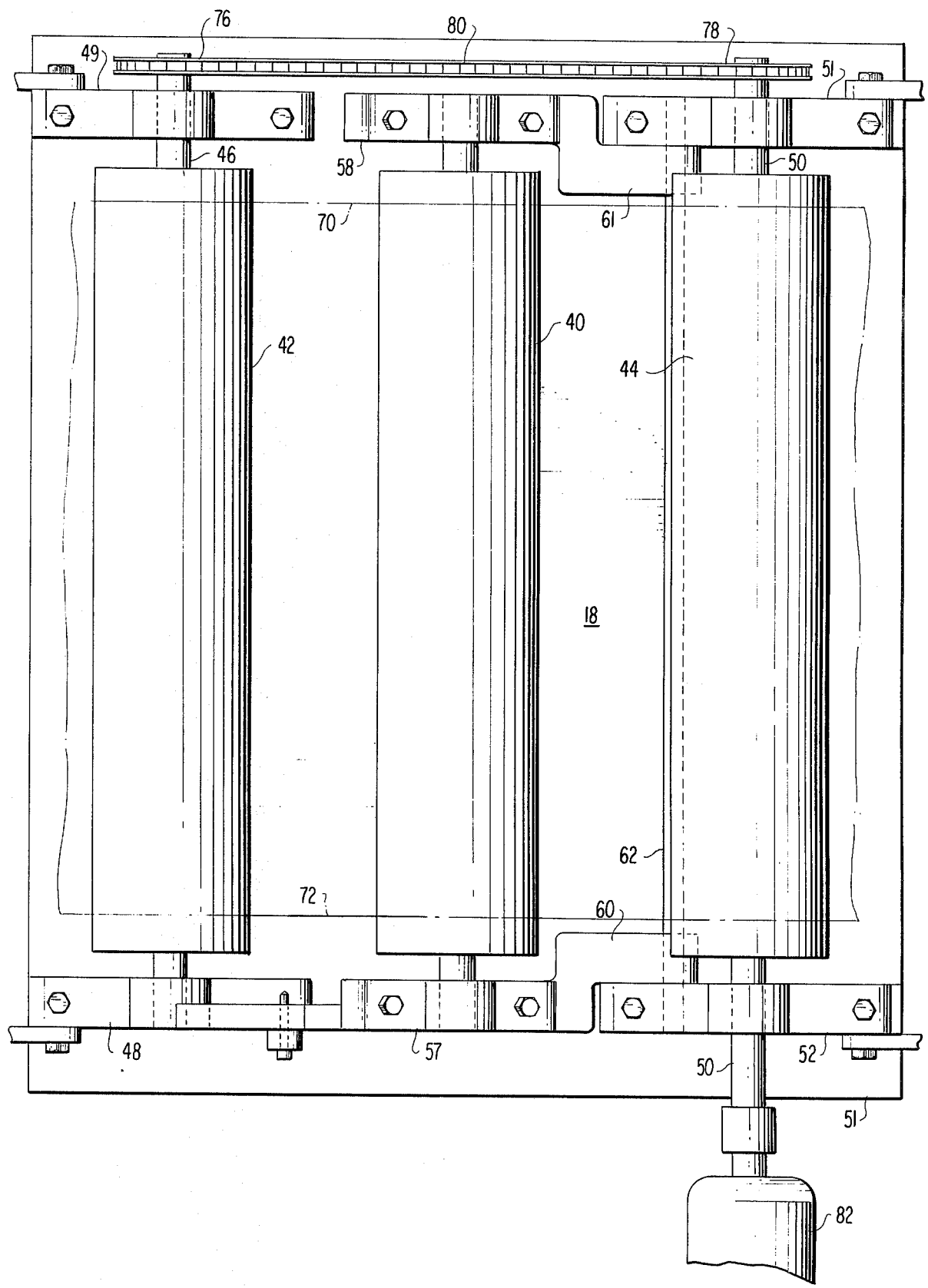
FIG. 3 is a top plan view of the apparatus of FIG. 2 providing driving power to auxiliary equipment.

FIGS. 2 and 3 show in more detail the power take-off 34 and its cooperation with the return flight 23 of belt 18. Power take-off unit 34 includes a shiftable tension roller 40 and a pair of driveable rollers 42 and 44. These rollers are so positioned that the return flight 23 of the conveyor belt is between tension roller 40 and driveable rollers 42, 44.

Roller 42 has an axle or shaft 46 which mounts the roller for rotation in bearing blocks 48, 49 (FIG. 3) positioned at longitudinally opposite ends of the roller. Similarly, roller 44 has its axle or shaft 50 mounted for rotation in bearing blocks 51, 52. The several bearing blocks are secured to a base plate 53 so rollers 42 and 44 are in parallel fixed relationship to each other, having their axes 46, 50 perpendicular to the direction of travel of belt 18 and spaced longitudinally with relation to belt travel. Base plate 53 can be secured to conveyor framework 27 by connector arms, such as 54, 55, and similar connector means may be used to provide additional stability or support from surrounding areas.

Axle 56 for tension roller 40 is mounted for rotation in a pair of bearing blocks 57, 58 which are mounted on elongated support arms 60, 61. This support structure is pivotable about pivot shaft 62. Pivot shaft 62 is parallel to shaft 56 and provides for swinging or shifting movement of roller 40.

Figure 4:
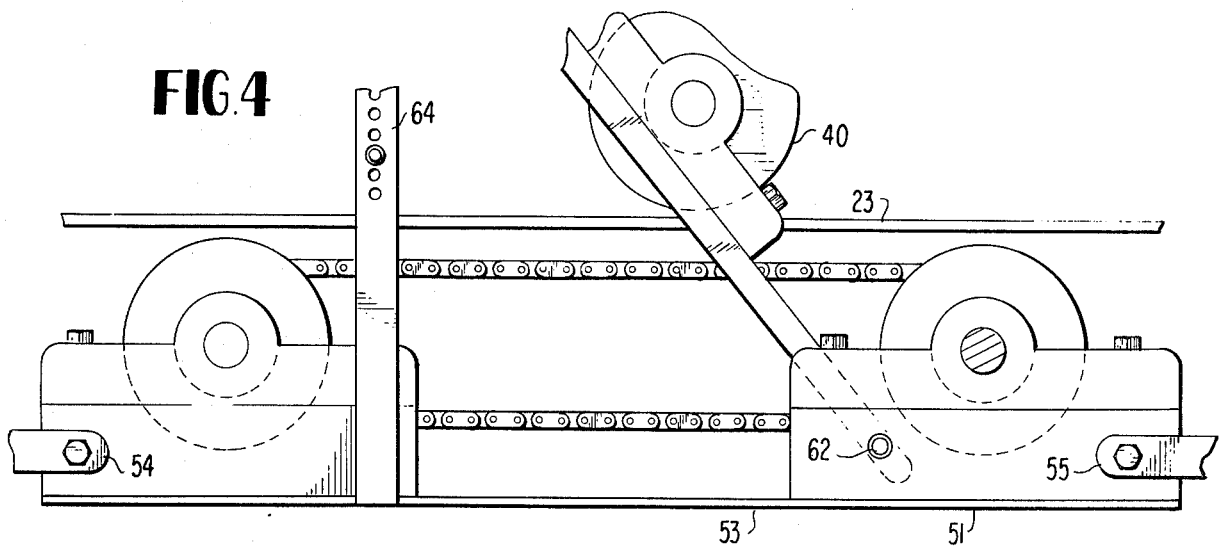
FIG. 4 is a view of the apparatus of FIG. 2 when not operating to delivery power.

Secured to a longitudinal end of one or both elongated support arms 60, 61 is a shift handle 63 which provides for manually swinging the tension roller assembly about shaft 62 from the position of FIG. 2, in which the tension roller 40 deflects the belt into driving engagement with driveable rollers 42 and 44, to the position of FIG. 4 in which the return flight 23 of the belt is out of driving contact with rollers 42, 44. An upright lock bar 64, secured to base plate 53, provides for locking the tension roller assembly in either the drive position of FIG. 2 or idle position of FIG. 4. Such locking is accomplished by inserting a lock pin 66 through a selected vertical opening 68 of lock bar 64, the pin extending through a slot 70 in handle 62 to hold the handle in the locked position. The provision of multiple openings, such as 68, permits adjustment of the position of the tension roller 40 and, the extent that tension roller 40 deflects the belt 18. This assures sufficient friction between return flight 23 and drive rollers 42, 44 to rotate such rollers and drive the auxiliary equipment coupled to the rollers.

Bearing blocks 57, 58 can be equipped with quick assembly means to permit removal of tension roller 40 for assembly of the power take-off unit 34 in working position. After the bearing plate 53 is secured with the rollers 42, 44 in desired position, tension roller 40 is assembled on the opposite side of the belt.

As shown at FIG. 3, rollers 40, 42 and 44 have a length approximating the width of the conveyor belt 18. Handle 62 for engaging the drive, as well as the bearing blocks 57, 58 for roller 40 are located beyond the side edges 70, 72 (shown in dotted lines) of conveyor belt 18. Any of the rollers 40, 42, 44 can be equipped with guide slots for longitudinal positioning of the belt 18 during its travel through power take-off unit 34.

Sprockets 76 and 78 are keyed to shafts 46 and 50 respectively, and a chain 80 extends between the sprockets so rollers 42 and 44 rotate uniformly with each sharing the load and avoiding slippage which might occur from attempting to take power from a single roller.

Shafts 46 and 50 can be extended axially and coupled to whatever auxiliary equipment is to be driven in the mine, for example, a pump 82, as shown in FIG. 3. Or the chain 80, driven by sprockets 76, 78 can be used to drive auxiliary equipment.

Each of the rollers 40, 42 and 44 is preferably covered with a fire resistant rubber which can be adhesively secured or bonded to the surfaces of the respective rolls to increase the coefficient of friction between rollers 42, 44 and the surface of the conveyor belt 18.

Manipulating handle 62 permits selectively shifting the power take-off into and out of driving engagement with the belt 18. When it is desired to operate pump 82, tension roller 40 is shifted from its FIG. 4 position to the FIG. 2 position and pin 66 is inserted to lock the handle and the tension roller at the required position to obtain the desired deflection of the conveyor belt. The belt can be moved out of contact with driveable rollers 42,44 or the auxiliary equipment can be disconnected and the belt be merely supported by the rollers 42,44 in non-driving relationship.

It will be appreciated that the driving of the pump 82, or other auxiliary equipment, can be accomplished mechanically without electrical power cables or specialized electrical equipment. It is, however, within the contemplated scope of this invention to drive a generator from the power take-off unit to provide a local electrical source of power, where desired and local conditions permit, without cables from outside the mine.

While the power take-off unit shown and described includes a shiftable tension roller 40 above the return flight 23 of the belt, and drive rollers 42 and 44 below the return flight of the belt, it will of course be appreciated that the drive rollers can be disposed above the return flight of the belt and the tension roller can be below the belt, while attaining similar desirable results.

In the light of the above teachings, changes in materials, locations, and dispositions of the various elements are available to those skilled in the art while utilizing the basic concepts of the invention; therefore, the scope of the present invention is to be determined from the appended claims.

I claim:

1. A system for obtaining mechanical power in a mine serviced by conveyor structure including a driven conveyor belt with a flight for removing mined material and a return flight, the system comprising, power take-off apparatus with means for positioning such apparatus in contiguous relationship to the conveyor structure, such power take-off apparatus including driveable roller means, framework structure for positioning the driveable roller means so as to be driven by the return flight of the conveyor belt, belt tensioning means for selectively urging such conveyor belt to drive such roller means, and a power shaft driven in response to rotation of such roller means for delivering mechanical drive power to auxiliary equipment.

2. The apparatus of claim 1 wherein the belt tensioning means comprises a tension roller, and support means mounting the tension roller for contact with the opposite surface of the conveyor belt from that of the driveable roller means.

3. The apparatus of claim 2 further including adjustable means for moving the tension roller to urge the conveyor belt into driving engagement with the driveable roller means.

4. The apparatus of claim 2 wherein the driveable roller means includes a pair of driveable rollers mounted on axles in parallel relationship and spaced longitudinally with relation to belt travel so as to position the pair of rollers in longitudinally spaced relationship along the travel path of the belt, the tension roller being positioned intermediate the longitudinally spaced rollers with its axle in parallel relationship to the driveable roller axles to urge the conveyor belt into driving engagement with both driveable rollers.

5. The apparatus of claim 4 further including coupling means coupling the spaced driveable rollers to rotate uniformly about their respective axles.

6. The apparatus of claim 2 in which the support means for the tension roller includes elongated support arms mounting the tension roller, and means for pivoting the support means to move the tension roller into driving engagement with the driveable roller means.

7. The apparatus of claim 6 including adjustment means for selectively positioning the support means and mounted tension roller for varying driving engagement of the conveyor belt with the driveable roller means.

8. The apparatus of claim 7 including means for locking the support means in a selected position.

9. The apparatus of claim 7 including tension roller axle means mounted in bearing block means on the elongated support arms so as to permit removal of the tension roller for assembly of the power take-off unit in working relationship to the driven conveyor belt.

10. The apparatus of claim 4 wherein the driveable rollers and tension roller have working surfaces approximating the width of the conveyor belt.

* * * * *